US007032244B2

(12) United States Patent
Wilkes

(10) Patent No.: US 7,032,244 B2
(45) Date of Patent: Apr. 18, 2006

(54) IDENTIFYING POTENTIAL INTRUDERS ON A SERVER

(75) Inventor: William Francis Wilkes, Centerport, NY (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 09/969,308

(22) Filed: Oct. 2, 2001

(65) Prior Publication Data

US 2003/0065948 A1 Apr. 3, 2003

(51) Int. Cl.
G06F 11/00 (2006.01)
G06F 11/22 (2006.01)
G06F 11/30 (2006.01)
G06F 11/32 (2006.01)
G06F 11/34 (2006.01)

(52) U.S. Cl. .......................................... 726/23; 726/27
(58) Field of Classification Search ........ 713/200–201; 726/23
See application file for complete search history.

(56) References Cited

U.S. PATENT DOCUMENTS

| 5,412,723 | A | | 5/1995 | Canetti et al. ................. 380/21 |
| 6,088,804 | A | * | 7/2000 | Hill et al. .................... 713/201 |
| 6,119,236 | A | | 9/2000 | Shipley ....................... 713/207 |
| 6,151,679 | A | | 11/2000 | Friedman et al. ............ 713/201 |
| 6,301,668 | B1 | * | 10/2001 | Gleichauf et al. ........... 713/201 |
| 6,408,391 | B1 | * | 6/2002 | Huff et al. ................... 713/201 |
| 2002/0087882 | A1 | * | 7/2002 | Schneier et al. ............. 713/201 |

FOREIGN PATENT DOCUMENTS

| EP | 0938046 | 8/1999 |
| WO | 9960462 | 11/1999 |

OTHER PUBLICATIONS

"Cell Directory Service—A Single Clerk per System on MVS/OS400 Distributed Computing Environment," IBM TDB vol. 38, No. 8, Aug. 1995, pp. 299-303.

"Luring Killer Bees with Honey," Network Computing, vol. 11, No. 16, Aug. 2000, pp. 100, 102-103.

"Selecting a Site for the Software Sentry," Security Management, vol. 43, No. 12, Dec. 1999 (abstract only).

"Domain and Type Enforcement Access Control Model in Firewall Systems," Proc. 20 Intl. Scientific School, Wroclaw, Poland 1998 (abstract only).

(Continued)

Primary Examiner—Ayaz Sheikh
Assistant Examiner—Arezoo Sherkat
(74) Attorney, Agent, or Firm—John R. Pivnichny

(57) ABSTRACT

An intruder on a server is identified by providing files having attractive names in a subdirectory of the server. An agent is provided within one or more of the files. The agent is launched on an intruder's processor after the file containing the agent is downloaded. The agent locates various files and data on the intruder's processor and sends copies of the files and data to the server thus allowing a network administrator at the server to identify the intruder.

20 Claims, 2 Drawing Sheets

OTHER PUBLICATIONS

"Verifying the Secure Setup of Unix Client/Servers and Detection of Network Intrusion," SPIE Proc. vol. 2616, 1996 (abstract only).

"Automated System Monitoring and Notification with Swatch," Proc. 7th Systems Admin. Conf., Berkeley, CA, 1993 (abstract only).

"How to Securely Replicate Services," ACM Trans on Prog. Lang., vol. 16, No. 3, May 1994 (abstract only).

"Intrusion and Defense of DDoS in TCP/IP Network," J. Nanjing Univ., vol. 32, No. 6, Dec. 2000 (abstract only).

"Countermeasure of WWW Security," J. Infor. Proc. and Mgmt., vol. 43, No. 4, Jul. 2000 (abstract only).

"Building Intrusion Tolerant Applications," Proc. 8th USENIX Security Symposium, Berkeley, CA, 1999 (abstract only).

"A System for Distributed Intrusion Detection," COMPCON Spring 91, Los Alamitos, CA (abstract only).

"Intrusion Tolerance in Distributed Computing Systems," Proc., 1991 IEEE Comp. soc. Symposium, Los Alamitos, CA (abstract only).

* cited by examiner

IDENTIFYING POTENTIAL INTRUDERS ON A SERVER

TECHNICAL FIELD

The invention relates to computer network security of a server and in particular to use of an agent for interacting with potential intruders on the server.

BACKGROUND OF THE INVENTION

There is currently a need to insure the security of server computers which provide access to many clients over a network such as the Internet. For example, when a server is connected to the Internet, it is not usually possible to deny access outright to the outside world or limit access to a few users. In general a server may want to have as many users as possible in order to provide information and in some cases accept orders or other transactions from customers or potential customers.

While most users will benefit from this type of open access, people with dishonorable intentions may take advantage of it to intrude on the server, causing disruption or damage to the server or data stored thereon. One way to protect a server from intrusion is to set up a gateway computer (called a firewall) between the server and the network. A firewall can be a separate computer running firewall software or the firewall software may be running on the server itself. A single firewall may also be configured to protect a plurality of servers.

A firewall attempts to check, route, and label all information that passes through it. The firewall attempts to detect or prevent intruders from causing harm to the server. For example a firewall can be programmed to recognize a known type of attack to the server and can also be programmed to deny access to a known intruder. However, new intruders attempting new types of attack represent a constant threat to this limited firewall protection.

Canetti et al. in U.S. Pat. No. 5,412,723 describe a method of allowing a set of servers to maintain a set of keys shared with a client. This method is effective if the client is known ahead of time to be trustworthy enough to share the keys. But it does not address the open access needed by many retail sales on other types of servers.

Shipley in U.S. Pat. No. 6,119,236 describes a device residing on a LAN (local area network). The LAN has a plurality of computers and connects to the Internet through a firewall. The device looks for code and patterns of behavior and assigns a value to perceived attempted security breaches and directs the firewall to take action based on the value. The effectiveness of this device is therefore dependent on the cleverness of network security administrators and other experts to define what code or behavior patterns constitute attempted security breaches. The effectiveness is also dependent on the cleverness and determination of intruders to bypass such defined code and behavior patterns. Usefulness of Shipley's technique is therefore limited. The technique must be continually updated as intruders discover new ways to bypass it.

Friedman et al. in U.S. Pat. No. 6,151,679 describe a security device that is connected between a client computer and a network. Through the use of a session key and encryption, the device does not allow the client to emulate another client by setting a false IP address. This invention can prevent a particular type of intruder attack e.g. false address approaches, but would not prevent other types of attacks.

Bernhard et al. in International application (PCT) WO99/60462 describe a method of responding to instances of computer misuse by selecting an appropriate active response module (ARM). The ARM is then deployed to perform actions to respond to the misuse. This method however, does not detect the initial instance of misuse. It would be used with some other type of intrusion detection system.

One type of intrusion detection system is described by J. Forristal in the article "Luring Killer Bees with Honey," published in Network Computing, Aug. 21, 2000, pages 100, 102–103. A honey pot, hereinafter is used to mean a program product which emulates a production server while alerting and logging intruder activity. The administrators of the target network know that only an intruder would attempt to access the honey pot.

Although each of the aforementioned techniques provides some protection from intruders, there remains a need for additional protection. In accordance with the teachings of the present invention, there is defined a new method and device for identifying potential intruders on a server. It is believed that such a technique and device would constitute a significant advancement in the art.

OBJECTS AND SUMMARY OF THE INVENTION

It is therefore a principal object of the present invention to enhance the intruder detection art by providing a method and device for intruder detection with enhanced capabilities.

It is another object to provide such a device wherein enhanced operational capabilities are possible.

It is further object to provide such a method and device which can be readily used to detect intrusion on a server or groups of servers.

These and other objects are attained in accordance with one embodiment of the invention wherein there is provided a method of identifying an intruder on a server, comprising the steps of, providing one or more lightly protected subdirectories on the server, each of the subdirectories having files with attractive names simulating content of interest to an intruder having a processor, providing an agent within one or more of the files, adapted to be launched on the processor when the intruder downloads from the server, a file having the agent, and receiving from the processor via a non-erasable transfer initiated by the agent, encrypted data of address book entries, custom word processing templates, e-mail files, letterheads, closure files, or signature files.

In accordance with another embodiment of the invention there is provided a computer system for identifying an intruder on a server, comprising, a server, means for providing one or more lightly protected subdirectories on the server, each of the subdirectories having files with attractive names simulating content of interest to an intruder having a processor, an agent within one or more of the files, adapted to be launched on the processor when the intruder downloads from the server, a file having the agent, and means for receiving from the processor via a non-erasable transfer initiated by said agent, encrypted data of address book entries, custom word processing templates, e-mail files, letterheads, closure files, or signature files.

In yet another embodiment of the invention there is provided a computer program product for instructing a processor to identify an intruder on a server, the computer program product comprising, a computer readable medium, first program instruction means for providing one or more lightly protected subdirectories on the server, each of the subdirectories having files with attractive names simulating content of interest to an intruder having a processor, second program instruction means for providing an agent within one or more of the files, adapted to be launched on the processor when the intruder downloads from the server, a file having the agent, and third program instruction means for receiving from the processor via a non-erasable transfer initiated by the agent, encrypted data of address book entries, custom word processing templates, e-mail files, letterheads, closure files, or signature files, and wherein all the program instruction means are recorded on said medium.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
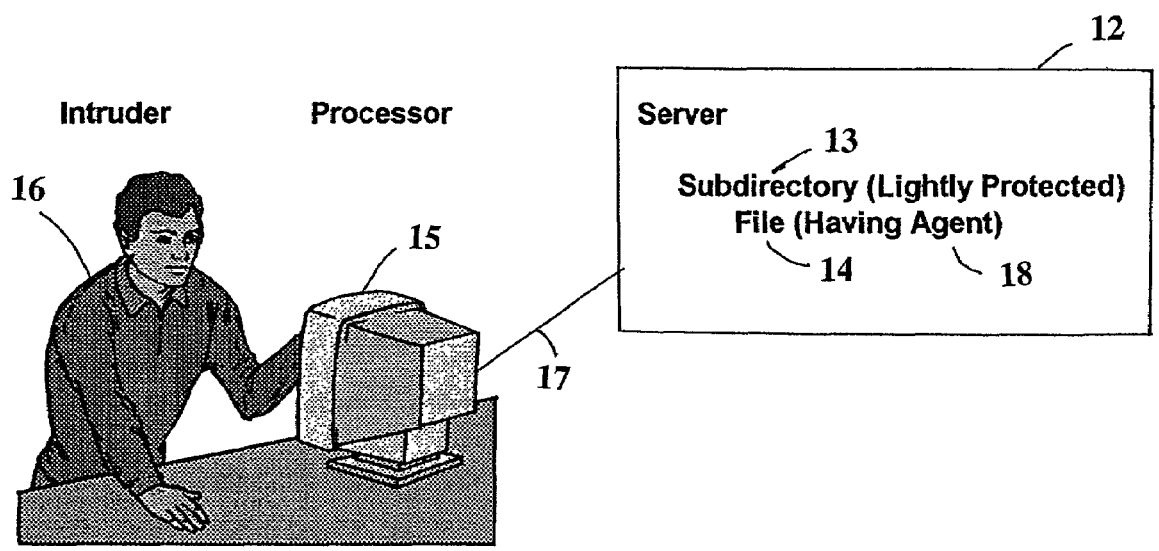
FIG. 1 illustrates one embodiment in accordance with the present invention.

In FIG. 1 there is shown a server 12 which may be any type of processing device capable of operating as a server. That is server 12 responds to requests from users or clients for data retrieval, data storage, and processing capability. Server 12 may be a single or plurality of processors whether configured as a single server or a plurality of interconnected servers. The data being retrieved or stored may be arranged or formatted in any manner known in the art. Some examples of data formats are HTML files, word processor files, graphical files such as .BMP (bitmap), .TIFF (Tagged Image File Format), .GIF (Graphics Interchange Format), .JPG (Joint Photographic Experts Group compressed image files), audio files (.AV, .WAV), video files (.MPEG, .AVI), spreadsheet data, and database data. The aforementioned data formats are given by way of example and not as a limitation. Processing capability may be requested to be performed at the server or indirectly at a remote server accessible from server 12 by executing code whether in source language or compiled formats. The user or client may also request code to be downloaded to a processor 15 for execution at the client.

Server 12 has one or more lightly protected subdirectories 13. As used herein "lightly protected" shall be taken to apply to subdirectories having files therein with some degree of security protection applied. The protection may be in the form of access control through password or other form where the password used is common and easily guessed, such as "drowssap" or "secret" or "p1ssw0rd." A hacker or intruder upon encountering this type of light protection, would judge that the contents may be of some value, and use known tools to break the password. In addition to being lightly protected, subdirectory 13 has files 14 with attractive names simulating content of interest to an intruder 16 having a processor 15. Intruder 16 interacts with processor 15 using any known means such as but not limited to keyboard, mouse, touch screen, and voice recognition microphone (all not shown). Intruder 15 connects to server 12 over connection 17 which may represent a network connection, e.g. internet whether by a hardwired network, dial-up, wireless, infrared, satellite or any other connection means. Intruder 15 is attracted to and downloads one or more files 14 having agent 18 from server 12. The file names may be attractive by comprising lists of user ids or weakly encrypted passwords or names relating to advanced technology. As used herein "weakly encrypted" shall mean encrypted using a relatively short encryption key. Such encryption would tend to make a file attractive to an intruder while also permitting use of known tools to break the encryption. The intruder would need to exert effort and concentration while using the known tools and thus be somewhat distracting from detecting background processing being conducted on his workstation by the agent as described below.

After the file 14 is downloaded onto processor 15, agent 18 launches and proceeds to send various items it finds on processor 15 over the connection 17 to server 12. The items may be encrypted data of address book entries, custom word processing templates, e-mail files, letterheads, closure files, signature files, log entries, or keystroke histories. A system administrator or software tool may then examine the items to help identify the intruder. For example, the intruder may be identified if a return address is included on a letterhead template or a name in a signature file. The system administrator might also identify the intruder from an email address in a sent or received mail file.

Prior to launching, the agent may attach itself to an operating system on processor 15. The agent may launch on startup of processor 15 or launch periodically or at timed intervals.

Figure 2:
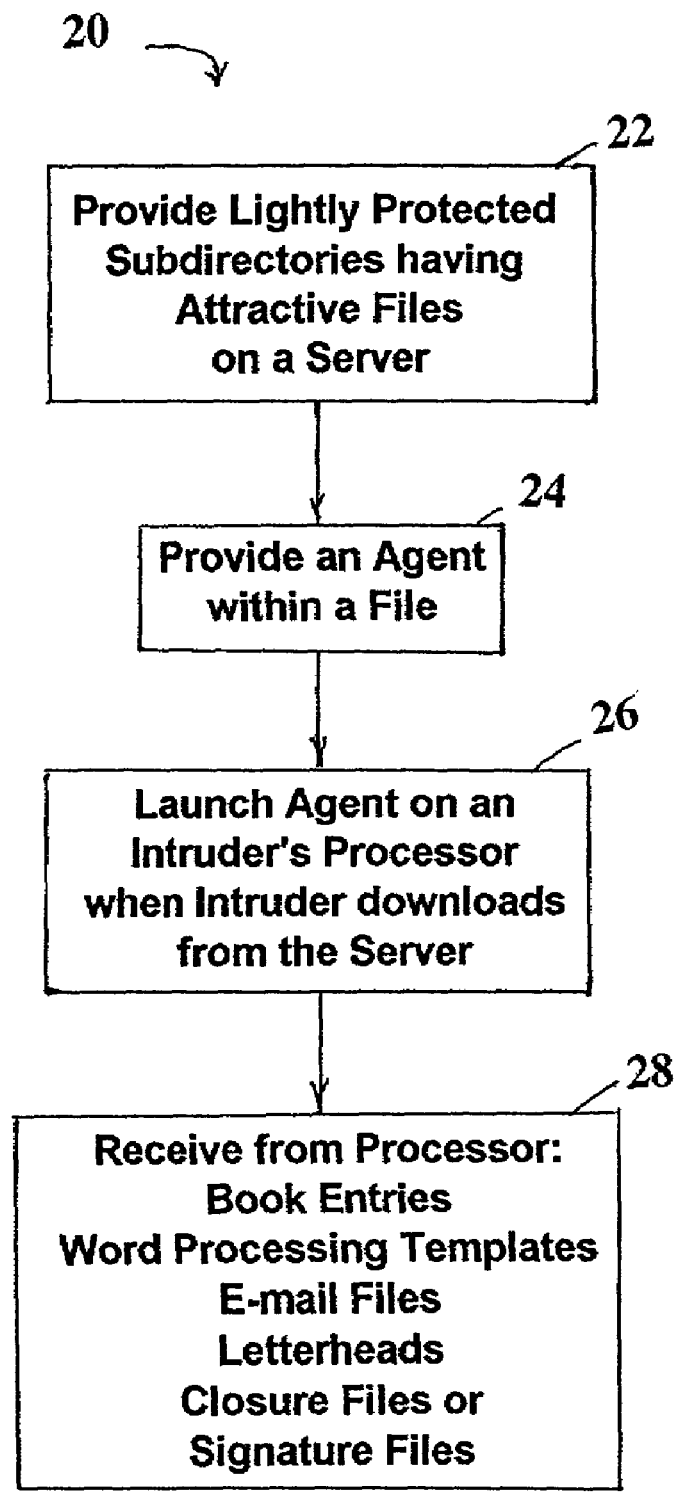
FIG. 2 is a flowchart showing steps of another embodiment of the present invention.

In FIG. 2 there is shown a flowchart illustrating the steps of an embodiment of the present invention. In step 22, lightly protected subdirectories having attractive file names are provided on a server. At least one file is provided with an agent therewithin adapted to launch on an intruder's processor when downloaded from the server as illustrated in step 24. In step 26 the agent is launched after being so downloaded. In step 28, the server receives various items from the processor via a transfer initiated by the launched agent. The agent may transfer over the same connection 17 of FIG. 1 used to download the agent, or any other subsequent connection between processor 15 and server 12. The agent may also make non-erasable transfers to minimize the chance of intruder 16 learning about the transfer.

One of ordinary skill in the art will recognize that the steps of FIG. 2 may be embodied as program instructions recorded on a computer readable medium (not shown) without departing from the present invention.

Thus there has been shown and described a method and system for identifying an intruder on a server which enhances the intruder detection art. The invention is thus deemed to constitute a significant advancement in the art.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of identifying an intruder on a server, comprising the steps of:
   providing one or more lightly protected subdirectories on said server, each of said subdirectories having files with attractive names simulating content of interest to an intruder having a processor;
   providing an agent within one or more of said files, adapted to be launched on said processor when said intruder downloads from said server, a file having said agent; and receiving from said processor via a non-erasable transfer initiated by said agent, data of address book entries, custom word processing templates, e-mail files, letterheads, closure files, or signature files, said data being first encrypted by said agent prior to said non-erasable transfer.

2. The method of claim 1, wherein said attractive names are lists of user ids.

3. The method of claim 1, wherein said attractive names are weakly encrypted passwords.

4. The method of claim 1, wherein said attractive names comprise names that appear to relate to advanced technology.

5. The method of claim 1, wherein said agent attaches itself to an operating system on said processor.

6. The method of claim 1, wherein said agent launches on start up of said processor.

7. The method of claim 1, wherein said agent launches on said processor at timed intervals.

8. The method of claim 1, further comprising monitoring network connections of said processor by said agent and receiving log entries from said processor when said processor connects to said server.

9. The method of claim 1, further comprising monitoring network connections of said processor by said agent and receiving keystroke histories of said intruder from said processor when said processor connects to said server.

10. A computer system for identifying an intruder on a server, comprising:
  a server;
  means for providing one or more lightly protected subdirectories on said server, each of said subdirectories having files with attractive names simulating content of interest to an intruder having a processor;
  an agent within one or more of said files, adapted to be launched on said processor when said intruder downloads from said server, a file having said agent; and
  means for receiving from said processor via a non-erasable transfer initiated by said agent, data, encrypted by said agent, of address book entries, custom word processing templates, e-mail files, letterheads, closure files, or signature files.

11. The system of claim 10, wherein said attractive names are lists of user ids.

12. The system of claim 10, wherein said attractive names are weakly encrypted passwords.

13. The system of claim 10, wherein said attractive names comprise names that appear to relate to advanced technology.

14. The system of claim 10, wherein said agent is adapted to attach itself to an operating system on said processor.

15. The system of claim 10, wherein said agent is adapted to launch on start up of said processor.

16. The system of claim 10, wherein said agent is adapted to launch on said processor at timed intervals.

17. The system of claim 10, further comprising means for monitoring network connections of said processor by said agent and means for receiving log entries from said processor when said processor connects to said server.

18. The system of claim 10, further comprising means for monitoring network connections of said processor by said agent and means for receiving keystroke histories of said intruder from said processor when said processor connects to said server.

19. A computer program product for instructing a processor to identify an intruder on a server, said computer program product comprising:
  a computer readable medium;
  first program instruction means for providing one or more lightly protected subdirectories on said server, each of said subdirectories having files with attractive names simulating content of interest to an intruder having a processor;
  second program instruction means for providing an agent within one or more of said files, adapted to be launched on said processor when said intruder downloads from said server, a file having said agent; and
  third program instruction means for receiving from said processor via a non-erasable transfer initiated by said agent, data, encrypted by said agent, of address book entries, custom word processing templates, e-mail files, letterheads, closure files, or signature files; and
  wherein all said program instruction means are recorded on said medium.

20. The computer program product of claim 19, further comprising fourth program instruction means for monitoring network connections of said processor by said agent and receiving keystroke histories of said intruder from said processor when said processor connects to said server.

* * * * *